United States Patent [19]
Sakogawa

[11] Patent Number: 5,600,503
[45] Date of Patent: Feb. 4, 1997

[54] MAGNETIC RECORDING AND REPRODUCING APPARATUS HAVING PRINTED WIRING BOARDS CONNECTED TO EACH OTHER BY A CABLE

[75] Inventor: Hisashi Sakogawa, Morioka, Japan

[73] Assignee: Matsushita Electric Industrial Co., Ltd., Osaka, Japan

[21] Appl. No.: 263,676

[22] Filed: Jun. 22, 1994

[30] Foreign Application Priority Data

Jun. 25, 1993 [JP] Japan ................................. 5-154772

[51] Int. Cl.⁶ .................................................. G11B 33/00
[52] U.S. Cl. ........................... 360/69; 360/97.01; 370/535
[58] Field of Search .................................. 360/69, 97.01, 360/75, 23; 370/77, 78, 80

[56] References Cited

U.S. PATENT DOCUMENTS

| | | | |
|---|---|---|---|
| 5,241,436 | 8/1993 | Kawabata et al. ............ | 360/97.01 |
| 5,363,365 | 11/1994 | Ajima ........................... | 369/44.29 X |

FOREIGN PATENT DOCUMENTS

| | | | |
|---|---|---|---|
| 63-181545 | 7/1988 | Japan ................................. | 360/69 |
| 63-151052 | 10/1988 | Japan . | |
| 1-309533 | 12/1989 | Japan ................................. | 360/69 |
| 2-54638 | 2/1990 | Japan ................................. | 360/69 |

*Primary Examiner*—Andrew L. Sniezek
*Assistant Examiner*—James T. Wilson
*Attorney, Agent, or Firm*—Watson, Cole, Stevens, Davis, P.L.L.C.

[57] ABSTRACT

In a magnetic recording and reproducing apparatus having a signal multiplexer circuit and a signal demultiplexer circuit disposed on each of a plurality of circuit boards, including a record/reproduce control circuit board and a motor circuit board, connected to each other by a cable, the signal multiplexer circuit located on the circuit board generating a plurality of signals to be transmitted multiplexes these signals to form a multiplexed signal to be supplied to the other circuit board through the cable, and the corresponding signal demultiplexer circuit located on the other circuit board restores the multiplexed signal into the individual signals, so that the number of signal conductors in the cable interconnecting the plural circuit boards can be decreased, thereby improving the reliability of the connection and reducing the size of the connection.

4 Claims, 11 Drawing Sheets

FIG.9A IDX
FIG.9B DDP
FIG.9C WPP
FIG.9D HDP
FIG.9E EDP
FIG.9F TRG
FIG.9G Sc1
FIG.9H Sc2
FIG.9I Sc3
FIG.9J Sc4
FIG.9K Sc5
FIG.9L MPX2
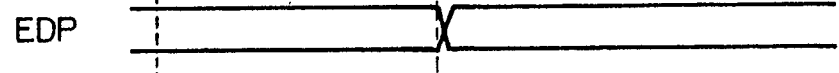
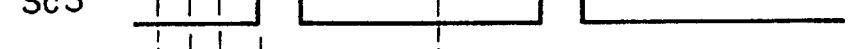
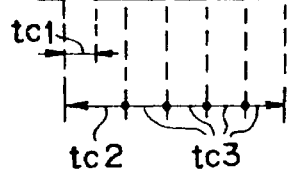

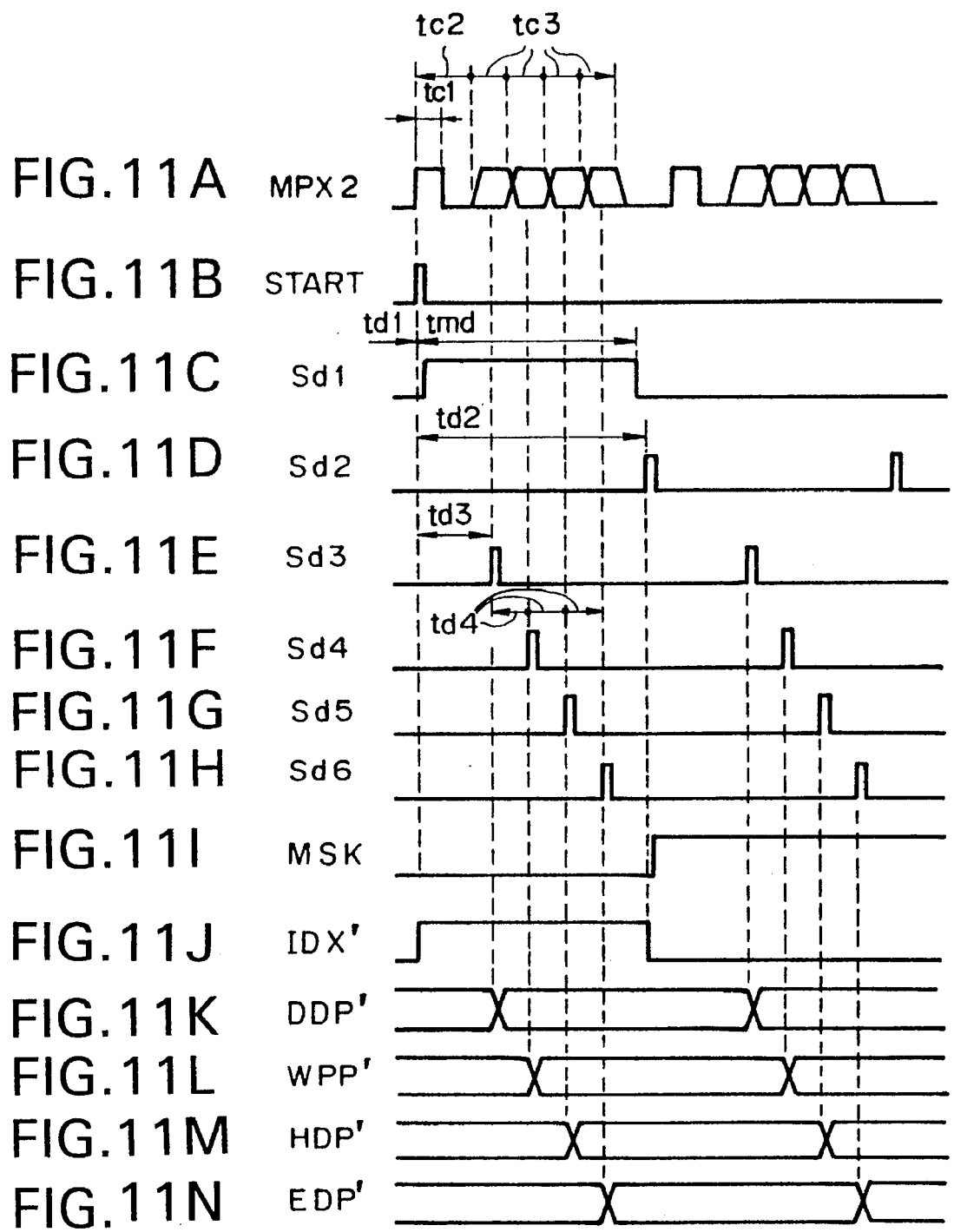

MAGNETIC RECORDING AND REPRODUCING APPARATUS HAVING PRINTED WIRING BOARDS CONNECTED TO EACH OTHER BY A CABLE

BACKGROUND OF THE INVENTION

1. Field of the Invention

This invention relates to a magnetic recording and reproducing apparatus which includes a plurality of printed wiring or circuit boards and whose electrical circuit is formed by connecting the printed wiring boards to each other by a cable.

2. Description of the Related Art

In a prior art magnetic recording and reproducing apparatus, its electrical circuit is divided into a plurality of sections formed on a plurality of printed wiring boards respectively, and these printed wiring boards are electrically connected to each other by a cable, so as to reduce the size of the housing of the apparatus or to prevent mutual interference by noise components generated from the electrical circuit of the apparatus. In such a prior art magnetic recording and reproducing apparatus, a signal conductor or line is electrically connected between the printed wiring boards for each kind of signals to be transmitted between these printed wiring boards.

FIG. 1 is a schematic block diagram showing the structure of an example of such a prior art magnetic recording and reproducing apparatus. For example, FIG. 1 shows the structure of a floppy disk drive having its electrical circuit formed by two printed wiring boards, that is, a printed wiring board for a motor circuit and a printed wiring board for record/reproduce control circuits.

In the floppy disk drive shown in FIG. 1, a disk cartridge 1 accommodating a magnetic recording medium 2 is loaded in the apparatus, and, in response to a demand from an externally connected system, information is recorded on or reproduced from the magnetic recording medium 2 by the function of magnetic heads 4 and 5. FIG. 2 is a schematic plan view showing the printed wiring boards and a connector between them in the floppy disk drive shown in FIG. 1.

Referring to FIGS. 1 and 2, the prior art magnetic recording and reproducing apparatus includes a spindle motor mechanism 3 for rotating the magnetic recording medium 2 accommodated in the disk cartridge 1, a head carriage 6 carrying magnetic heads 4 and 5 for recording information on the magnetic recording medium 2 or reproducing information from the magnetic recording medium 2, a step motor mechanism 7 for moving the head carriage 6 in a direction crossing the tracks on the magnetic recording medium 2, a record/reproduce control circuit board 8, a motor circuit board 9, and a cable 10 interconnecting the record/reproduce control circuit board 8 and the motor circuit board 9. Further, as shown in FIG. 2, the apparatus includes a disk cartridge detection switch 11 for whether or not the disk cartridge 1 is loaded in the apparatus, a write protect detection switch 12 for detecting whether or not the disk cartridge 1 is in its write protect state, an HD detection switch 13 for detecting whether or not the disk cartridge 1 is of the HD type, an ED detection switch 14 for detecting whether or not the disk cartridge 1 is of the ED type, an index sensor 15 for detecting the track reference position of the magnetic recording medium 2, and an LED 16 emitting light when the apparatus is in operation. In addition to those elements described above, the apparatus further includes a mechanism (not shown) for loading, holding and unloading the disk cartridge 1.

The record/reproduce control circuit board 8 is provided with a circuit 17 for driving the step motor mechanism 7, a recording and reproducing circuit 18 for recording a signal on the magnetic recording medium 2 or reproducing a signal from the magnetic recording medium 2 by means of the magnetic heads 4 and 5, a control circuit 19 for controlling the step motor drive circuit 17, the recording and reproducing circuit 18, the motor circuit board 9, etc., a connector 22 connecting the cable 10 for connection with the motor circuit board 9, and an interface connector 23 used for connection with a system (not shown) to which the apparatus is applied.

The motor circuit board 9 is provided with a spindle motor drive circuit 24 for driving the spindle motor 3, a spindle motor control circuit 25 for controlling the spindle motor drive circuit 24, a disk cartridge detection circuit 26 connected to the disk cartridge detection switch 11 for detecting whether or not the disk cartridge 1 is loaded in the apparatus, a write protect detection circuit 27 connected to the write protect detection switch 12 for detecting whether or not the disk cartridge 1 is in its write protect state, an HD detection circuit 28 connected to the HD detection switch 13 for detecting whether or not the disk cartridge 1 is of the HD type, an ED detection circuit 29 connected to the ED detection switch 14 for detecting whether or not the disk cartridge 1 is of the ED type, an index detection circuit 30 connected to the index sensor 15 for detecting whether or not the recording medium 2 is in its reference track position, an LED energization circuit 31 for energizing the LED 16 to signify that the apparatus is in operation, and a connector 34 connecting the cable 10 for connection with the record/reproduce control circuit board 8.

Three signals are usually supplied from the record/reproduce control circuit board 8 to the motor circuit board 9. That is, a signal MON is supplied to drive the spindle motor 3, a signal RPM is supplied to change over the rotation speed of the spindle motor 3, and a signal LED is supplied to energize the LED 16 to signify that the apparatus is in operation. On the other hand, five signals are usually supplied from the motor circuit board 9 to the record/reproduce control circuit board 8. That is, a signal IDX is supplied to index the track starting position, a signal DDP is supplied to indicate that the disk cartridge 1 is loaded or inserted already in the apparatus, a signal WPP is supplied to indicate that the disk cartridge 1 is in its write protect state, a signal HDP is supplied to indicate that the disk cartridge 1 is of the HD type, and a signal EDP is supplied to indicate that the disk cartridge 1 is of the ED type. In addition, at least two power supply conductors for connection with Vcc and GND are at least required for supplying power. Signal lines electrically connecting the printed wiring boards 8 and 9 to each other are prepared for all of these signals respectively. Therefore, in this case, a total of ten conductors (=eight signal lines plus two power supply conductors) are required to connect the printed wiring boards 8 and 9 to each other. These signal lines and power supply conductors are connected between the printed wiring boards 8 and 9 by soldering the cable 10 to the corresponding patterns provided on the wiring boards 8 and 9 or by means of the connectors 22 and 34, etc.

In the case of the prior art magnetic recording and reproducing apparatus described above, an increase in the number of the signals transmitted between the printed wiring boards 8 and 9 results in a corresponding increase in the number of the signal lines allocated to the individual signals respectively, and the area occupied by the cable 10 and the connectors 22 and 34 used for connection also increases. The increase in number of the terminals of the cable 10 and the connectors 22, 34 is disadvantageous in that the parts cost increases, and the reliability of the connection is lowered due to the increase in the soldered parts and the fitting parts between the connectors 22, 34 and the cable 10. On the other hand, the desired size reduction becomes difficult when the area occupied by the cable 10 and the connectors 22, 34 becomes wider. When an attempt is made to attain the desired size reduction without changing the number of the signal lines, the pitch between the terminals of the cable 10 and the connectors 22, 34 must inevitably be narrowed, resulting in lowering of the reliability of the connection.

In JP-U-63-151052, Kawada discloses that, when a plurality of printed wiring boards are connected by parallel buses, and a time-division multiplexing mode is used in a system of a small scale, the efficiency of communication in such a system can be improved. According to the above application, a bus protocol controller is provided for each of the printed wiring boards to be accessed so as to specify a peculiar bus protocol through an associated bus communication protocol line. Thus, according to the disclosure by Kawada, it is necessary to separately prepare the bus communication protocol lines, and the desired reduction of number of signal lines cannot be fully achieved.

SUMMARY OF THE INVENTION

With a view to solve such prior art problems, it is an object of the present invention to provide a magnetic recording and reproducing apparatus in which the number of signal lines used for transmission of signals between a plurality of printed wiring boards is reduced to permit the use of a cable and connectors having a small number of terminals, thereby improving the reliability of the connection and reducing the area occupied by the cable and the connectors, so that the size of the connection can be made small and the structure can also be simplified.

According to the present invention which attains the above object, there is provided a magnetic recording and reproducing apparatus comprising a plurality of printed wiring boards connected to each other by a cable, a multiplexer circuit disposed on each of the printed wiring boards for dividing a plurality of signals with respect to time and then multiplexing the time division signals to supply the multiplexed signal to a single signal line, and a corresponding demultiplexer circuit disposed on each of the printed wiring boards for demultiplexing a multiplexed signal into the individual signals, whereby the signals transmitted between the printed wiring boards can be multiplexed.

According to the magnetic recording and reproducing apparatus of the present invention having the structure described above, signals transmitted between a plurality of printed wiring boards are multiplexed, so that the printed wiring boards can be connected to each other by a small number of signal lines.

BRIEF DESCRIPTION OF THE DRAWINGS

FIG. 9 is a timing chart of various signals in the signal multiplexer circuit shown in FIG. 8.

FIG. 11 is a timing chart of various signals in the signal demultiplexer circuit shown in FIG. 10.

DESCRIPTION OF THE PREFERRED EMBODIMENTS

An embodiment of the magnetic recording and reproducing apparatus according to the present invention will now be described by reference to the drawings.

The illustrated embodiment of the present invention is a floppy disk drive having its electrical circuit formed by connecting two printed wiring boards, that is, a motor circuit board and a record/reproduce control circuit board by a cable and connectors.

Figure 1:
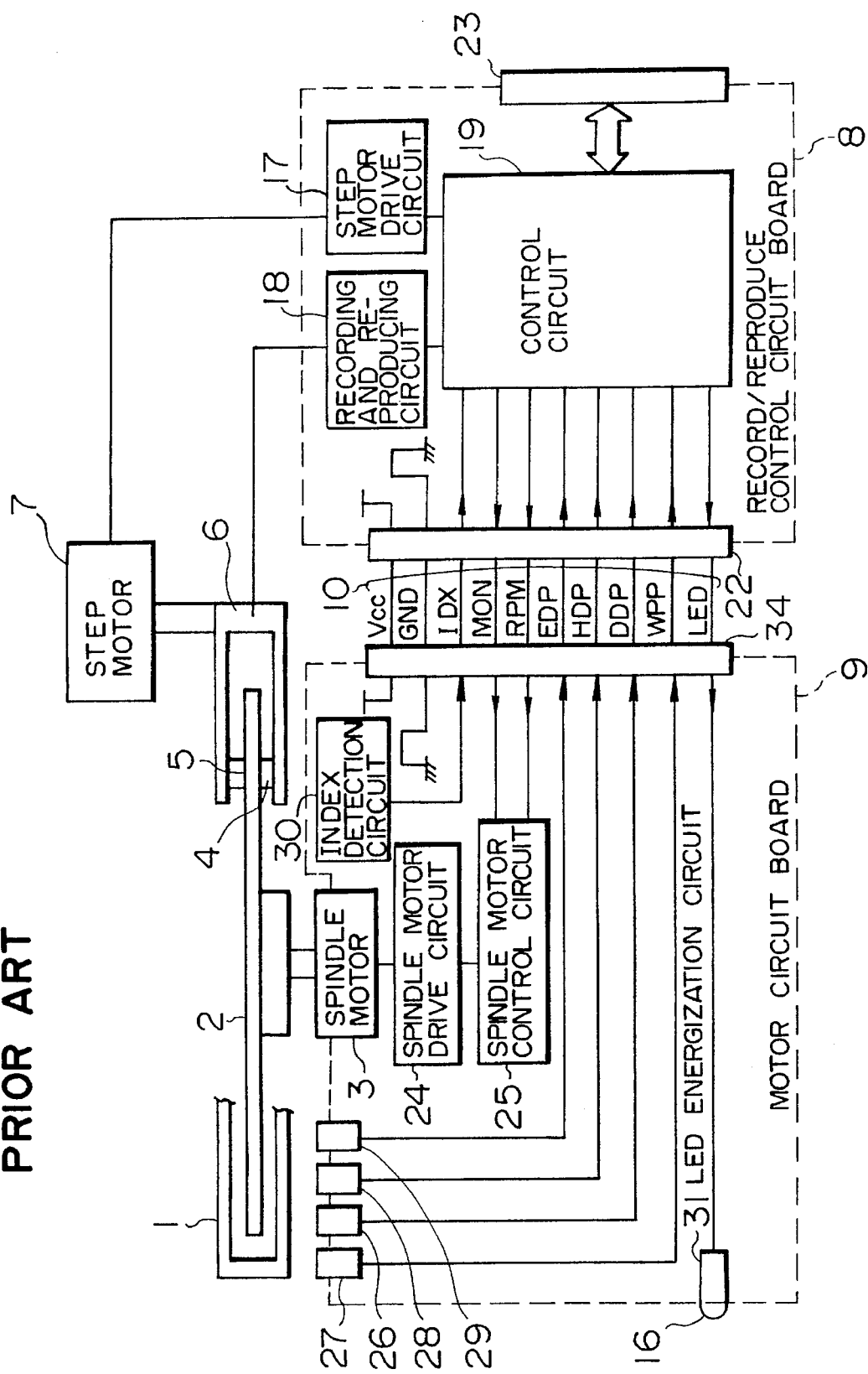
FIG. 1 is a schematic block diagram showing the structure of a prior art magnetic recording and reproducing apparatus.
Figure 2:
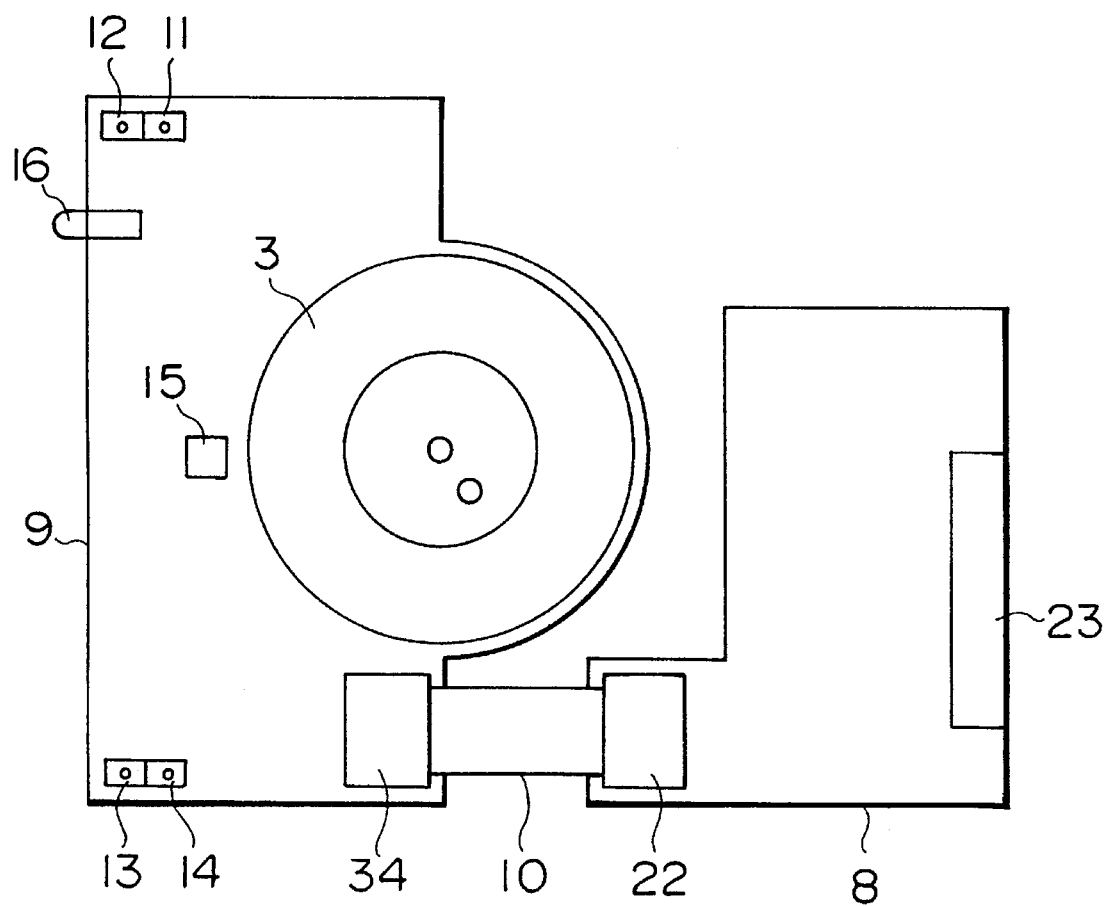
FIG. 2 is a schematic plan view showing the connection between the record/reproduce control circuit board and the motor circuit board in the prior art magnetic recording and reproducing apparatus shown in FIG. 1.
Figure 3:
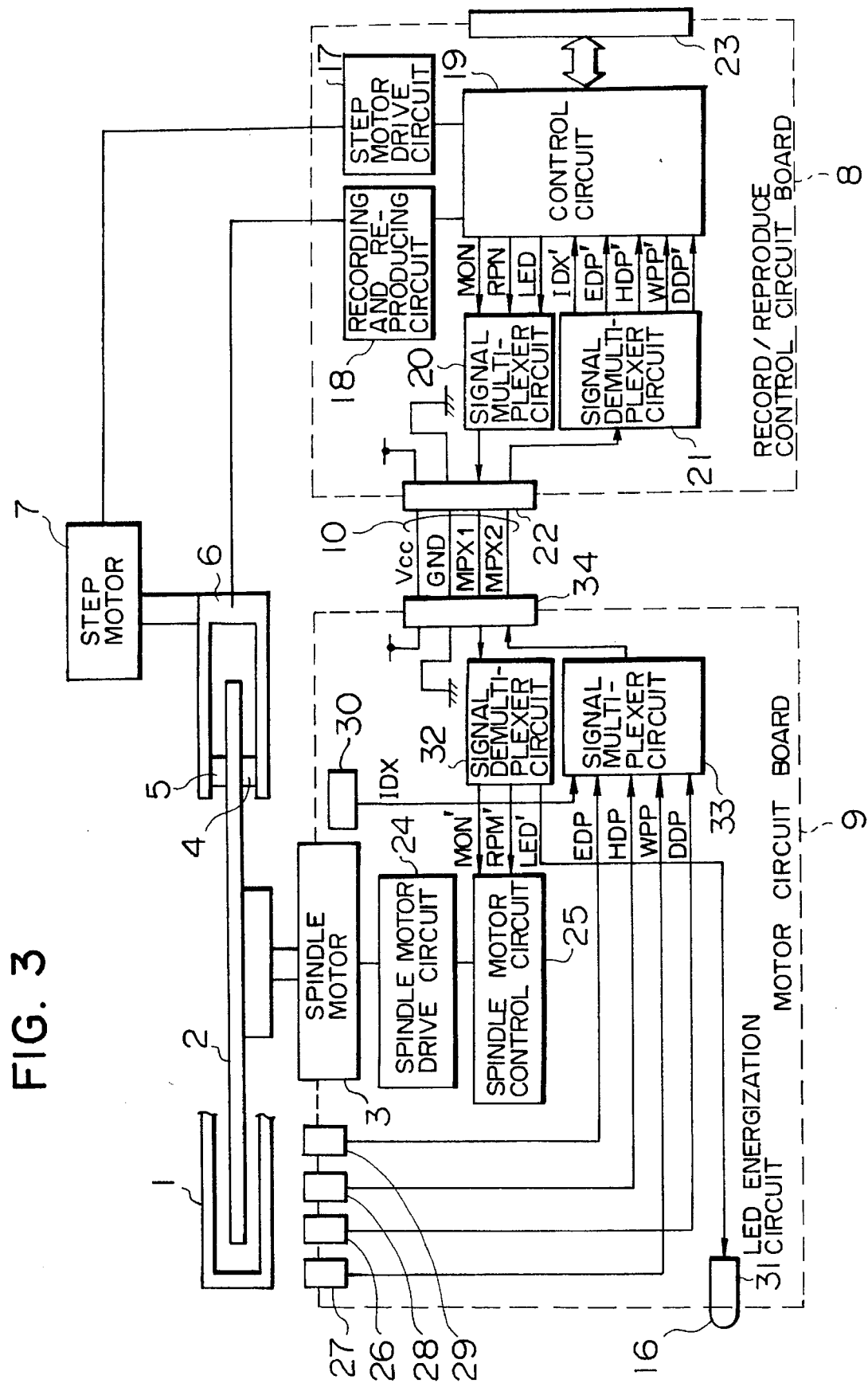
FIG. 3 is a schematic block diagram showing the structure of an embodiment of the magnetic recording and reproducing apparatus of the present invention.

FIG. 3 is a schematic block diagram showing the structure of the embodiment of the present invention, and like reference numerals are used in FIG. 3 to designate like parts appearing in FIGS. 1 and 2.

The connection between a record/reproduce control circuit board and a motor circuit board in the embodiment of the present invention does not differ from that in the prior art example shown in FIG. 2, except that the size of a cable and connectors is smaller than of the prior art example.

Figure 4:
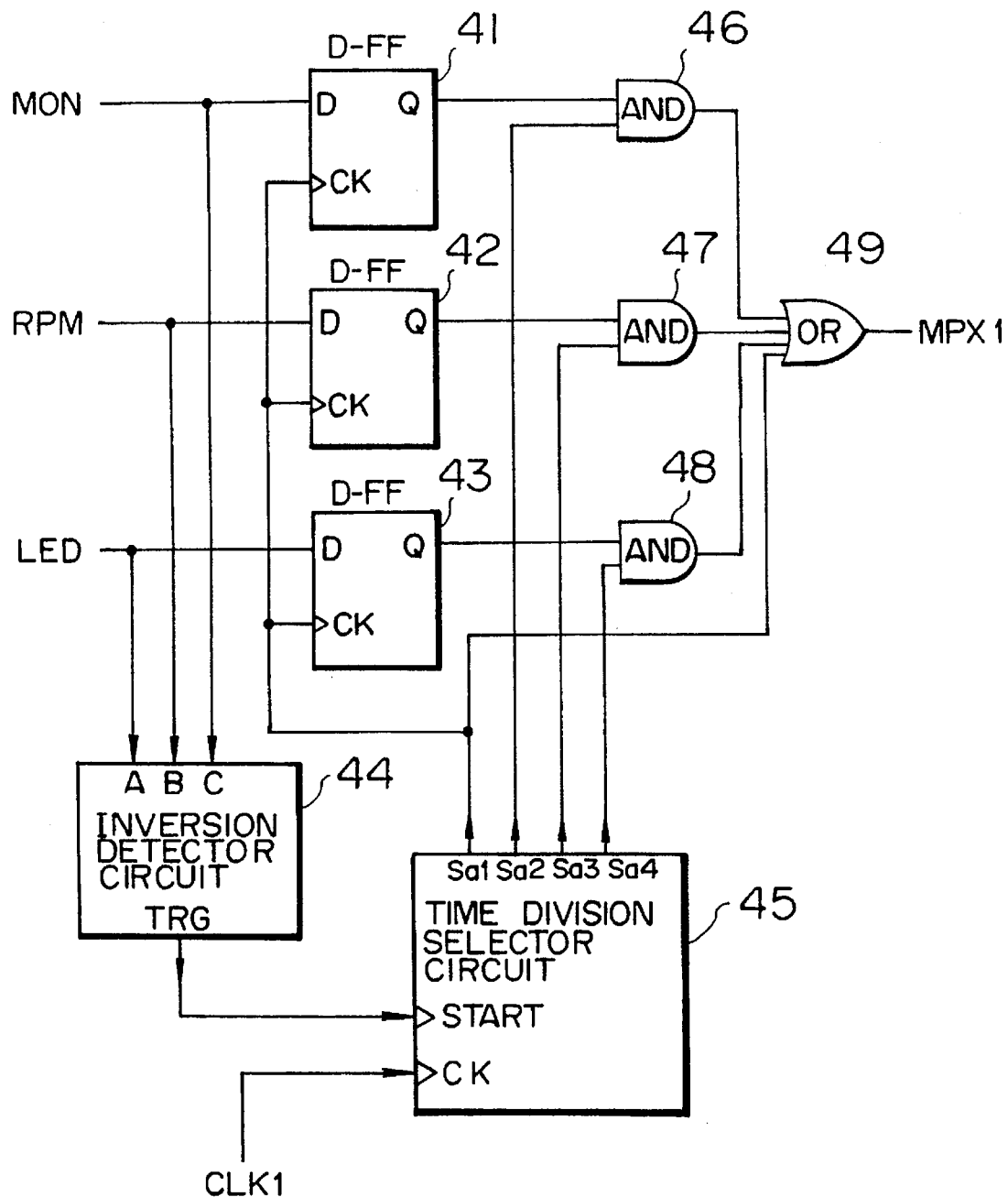
FIG. 4 is a circuit diagram showing the structure of the signal multiplexer circuit disposed on the record/reproduce control circuit board in the magnetic recording and reproducing apparatus shown in FIG. 3.

As shown in FIGS. 3 and 4, the apparatus of the disclosed embodiment of the present invention includes components having functions similar to those of the prior art floppy disk drive. That is, the apparatus includes a spindle motor mechanism 3, a head carriage 6 carrying magnetic heads 4 and 5, a step motor mechanism 7, a record/reproduce control circuit board 8, a motor circuit board 9, a cable 10, a disk cartridge detection switch 11, a write protect detection switch 12, an HD detection switch 13, an ED detection switch 14, an index sensor 15, an LED 16, and a mechanism (not shown) for loading, holding and unloading a disk cartridge 1.

As in the case of the prior art floppy disk drive, the record/reproduce control circuit board 8 is provided with, in addition to a step motor drive circuit 17, a recording and reproducing circuit 18, a control circuit 19, a cable connector 22 and an interface connector 23, a signal multiplexer circuit 20 for multiplexing a plurality of signals to be transmitted from the record/reproduce control circuit board 8 to the motor circuit board 9, and a signal demultiplexer circuit 21 for demultiplexing or restoring a multiplexed signal transmitted from the motor circuit board 9 to the record/reproduce control circuit board 8 into the individual signals.

Also, as in the case of the prior art floppy disk drive, the motor circuit board 9 is provided with, in addition to a spindle motor drive circuit 24, a spindle motor control circuit 25, a disk cartridge detection circuit 26, a write protect detection circuit 27, an HD detection circuit 28, an ED detection circuit 29, an index detection circuit 30, an LED energization circuit 31, and a cable connector 34, a signal demultiplexer circuit 32 for demultiplexing or restoring a multiplexed signal transmitted from the record/reproduce control circuit board 8 to the motor circuit board 9 into the individual signals, and a signal multiplexer circuit 33 for multiplexing a plurality of signals to be transmitted from the motor circuit board 9 to the record/reproduce control circuit board 8.

The signal multiplexer circuit 20 disposed on the record/reproduce control circuit board 8 multiplexes three signals supplied from the record/reproduce control circuit board 8 to the motor circuit board 9, that is, a signal MON used to drive the spindle motor 3, a signal RPM used to change over the rotation speed of the spindle motor 3 and a signal LED used to energize the LED 16 to signify that the apparatus is in operation, and the multiplexed signal is transmitted by a signal line MPX1. The signal multiplexer circuit 33 disposed on the motor circuit board 9 multiplexes five signals supplied from the motor circuit board 9 to the record/reproduce control circuit board 8, that is, a signal IDX indicating the track starting position, a signal DDP signifying that a disk cartridge 1 is inserted already into the apparatus, a signal WPP signifying that the disk cartridge 1 is in its write protect state, a signal HDP signifying that the disk cartridge 1 is of the HD type, and a signal EDP signifying that the disk cartridge 1 is of the ED type, and the multiplexed signal is transmitted by another signal line MPX2. In the signal demultiplexer circuit 32 disposed on the motor circuit board 9, the signals MON, RPM and LED forming the multiplexed signal transmitted by the signal line MPX1 are restored as individual signals MON', RPM' and LED' respectively. Among the restored signals, the signals MON' and RPM' are supplied to the spindle motor control circuit 25 to control the spindle motor 3, while the signal LED' is supplied to the LED energization circuit 31 to control energization of the LED 16. In the signal demultiplexer circuit 21 disposed on the record/reproduce control circuit board 8, the signals IDX, DDP, WPP, HDP and EDP forming the multiplexed signal transmitted by the signal line MPX2 are restored as individual signals IDX', DDP', WPP', HDP' and EDP' respectively. The restored signals are supplied to the control circuit 19 to be used for confirmation of the track starting position on the magnetic recording medium 2, whether or not the disk cartridge 1 is present, whether or not the disk cartridge 1 is in its write protect state, and whether the disk cartridge 1 is of the HD type or the ED type.

The detailed structures of the signal multiplexer circuit 20, the signal demultiplexer circuit 32, the signal multiplexer circuit 33 and the signal demultiplexer circuit 21 will now be described.

FIG. 4 is a circuit diagram showing the structure of the signal multiplexer circuit 20. As shown in FIG. 4, D-flip-flops (referred to hereinafter as D-FF's) 41, 42 and 43 for holding the signals MON, RPM and LED respectively are provided, and the signal MON is connected to the terminal D of the D-FF 41, the signal RPM is connected to the terminal D of the D-FF 42, and the signal LED is connected to the terminal D of the D-FF 43. Further, the signals MON, RPM and LED are connected to input terminals A, B and C of an inversion detector circuit 44 respectively. A pulse is generated from an output terminal TRG of this inversion detector circuit 44 when the signal level of any one of signal inputs to the input terminals A, B and C is inverted. The output terminal TRG of the inversion detector circuit 44 is connected to an input terminal START of a time division selector circuit 45. The timing of appearance of output signals from output terminals Sa1, Sa2, Sa3 and Sa4 of the time division selector circuit 45 is determined on the basis of the leading edge of the signal supplied to the input terminal START. A reference clock signal CLK1 used in the record/reproduce control circuit board 8 is supplied to terminal CK of the time division selector circuit 45 to determine the timing. The output terminal Sa1 of the time division selector circuit 45 is connected to the terminals CK of the D-FF's 41 to 43, so that the signal levels at the terminals D of the respective D-FF's 41 to 43 are held in response to the leading edge of the output signal generated from the output terminal Sa1. The output terminals Q of the D-FF's 41 to 43 are connected to one of two input terminals of AND gates 46 to 48 respectively, and these AND gates 46 to 48 are connected at the other input terminal to the output terminals Sa2, Sa3 and Sa4 of the time division selector circuit 45 respectively. Therefore, the output signals appearing at the terminals Q of the D-FF's 41 to 43 are supplied as inputs to an OR gate 49 after being gated by the output signals appearing at the output terminals Sa2, Sa3 and Sa4 of the time division selector circuit 45 respectively. The output signal appearing at the output terminal Sa1 of the time division selector circuit 45 is also supplied as an input to the OR gate 49. The output signal of the OR gate 49 is supplied to the motor circuit board 9 by the signal line MPX1.

Figure 5:
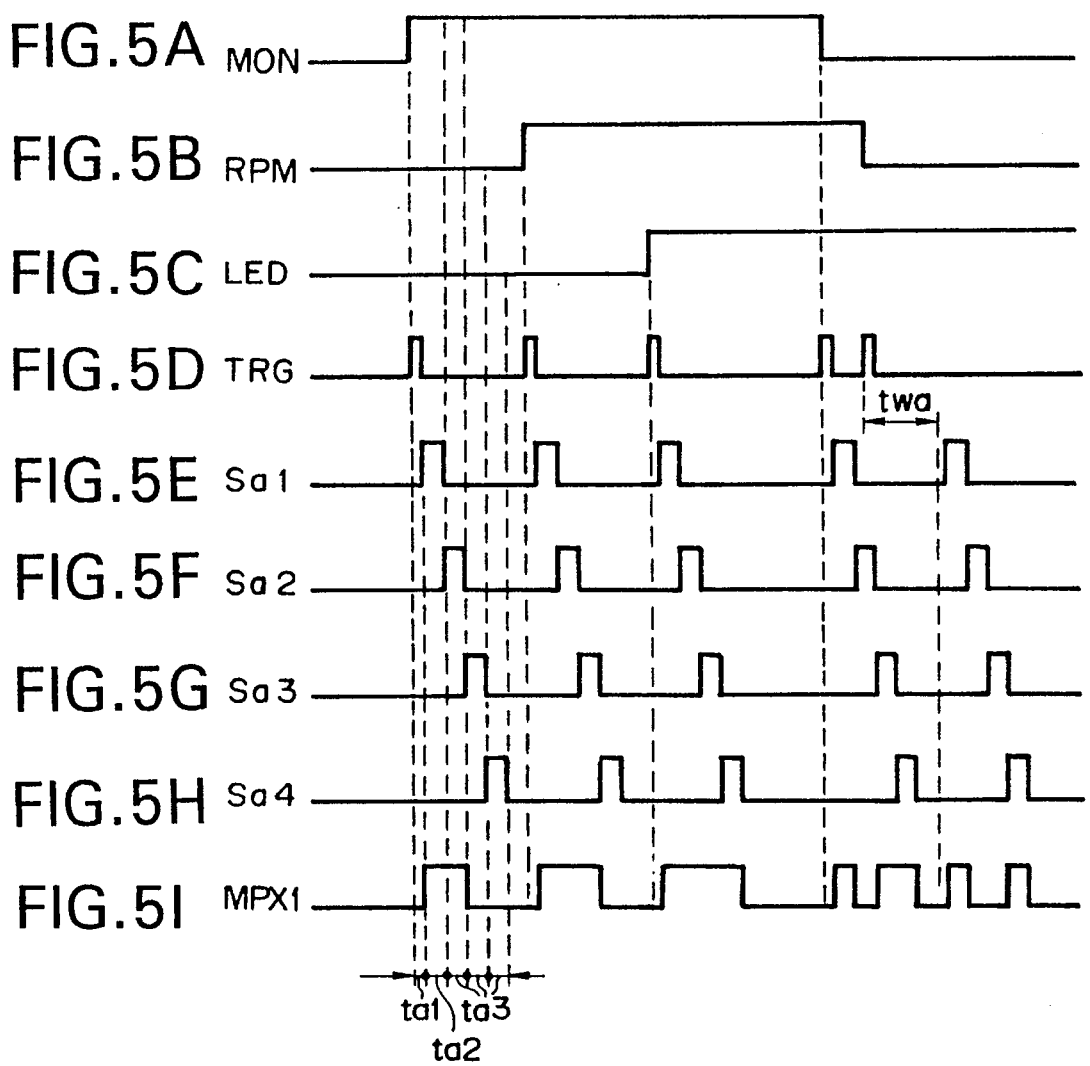
FIG. 5 is a timing chart of various signals in the signal multiplexer circuit shown in FIG. 4.

Now, FIG. 5 is used to illustrate the timing of the individual signals in the signal multiplexer circuit 20. When the signal level of any one of the signals MON, RPM and LED is inverted, the inversion detector circuit 44 detects the level inversion, and a pulse is generated from its output terminal TRG. In the time division selector circuit 45 to which the output signal from the output terminal TRG of the inversion detector circuit 44 is supplied to its input terminal START, an output pulse having a pulse width ta2 is generated from the terminal Sa1 in a relation delayed by a period of ta1 from the leading edge of the pulse inputted to the terminal START, an output pulse having a pulse width ta3 is generated from the terminal Sa2 in synchronism with the trailing edge of the pulse generated from the terminal Sa1, an output pulse having a pulse width ta3 is generated from the terminal Sa3 in synchronism with the trailing edge of the pulse generated from the terminal Sa2, and an output pulse having a pulse width ta3 is generated from the terminal Sa4 in synchronism with the trailing edge of the pulse generated from the terminal Sa3. The terminal Sa1 is directly connected to the OR gate 49, so that the pulse output from the terminal Sa1 appears directly as the output signal from the OR gate 49 connected to the signal line MPX1. As the period of ta1 lapses after the signal level of any one of the signals MON, RPM and LED is inverted, the D-FF's 41 to 43 latch the levels of the signals connected to the respective terminals D in response to the leading edge of the output signal appearing from the terminal Sa1 of the time division selector circuit 45, and the latched signals are then outputted from their output terminals Q respectively.

It will be seen that, by the combination of the AND gates 46 to 48 and the output signals generated from the terminals Sa2, Sa3 and Sa4 of the time division selector circuit 45, the signal latched in the D-FF 41 is supplied to the OR gate 49 during the period of ta3 after the period of ta2 counted from the leading edge of the signal generated from the terminal Sa1, the signal latched in the D-FF 42 is supplied to the OR gate 49 during the period of ta3 counted from the trailing edge of the signal generated from the terminal Sa2, and the signal latched in the D-FF 43 is supplied to the OR gate 49 during the period of ta3 counted from the trailing edge of the signal generated from the terminal Sa3. According to such logic, the signal MON latched during the period of ta3 after the period of ta2 counted from the leading edge of the signal generated from the terminal Sa1, the signal RPM latched during the period of ta3 immediately after the signal MON, and the signal LED latched during the period of ta3 immediately after the signal RPM are multiplexed in the time division mode, and the multiplexed signal is outputted to the signal line MPX1. When the signal level of any one of the signals MON, RPM and LED is inverted while the multiplexed signal is being outputted, the level inversion detection signal is latched in the time division selector circuit 45, and, after sending out the preceding level inversion information, that is, after a period of twa in FIG. 5, the multiplexed signal formed by similar logic is outputted to the signal line MPX1.

Figure 6:
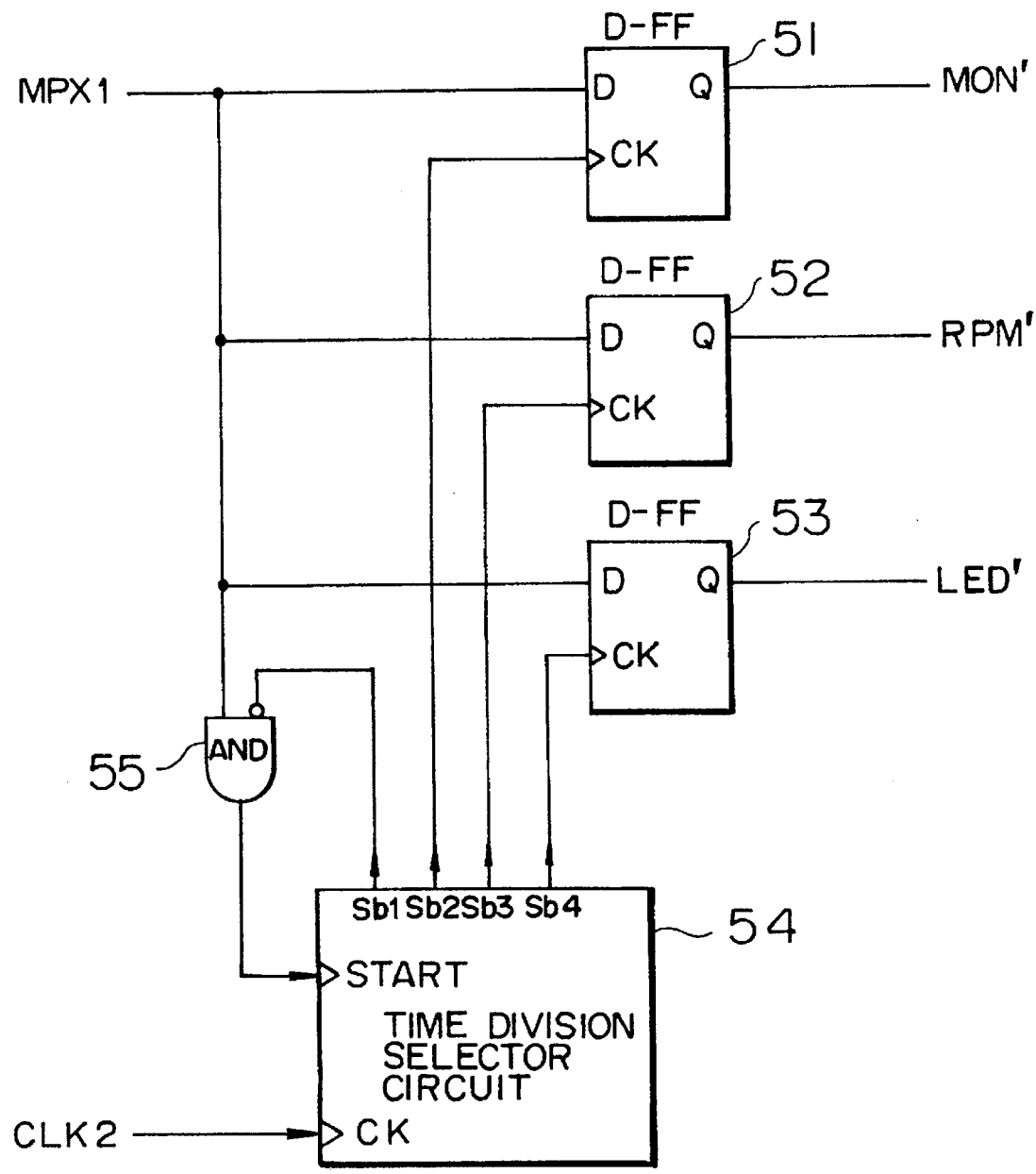
FIG. 6 is a circuit diagram showing the structure of the signal demultiplexer circuit disposed on the motor circuit board in the magnetic recording and reproducing apparatus shown in FIG. 3.

FIG. 6 is a circuit diagram showing the structure of the signal demultiplexer circuit 32. As shown in FIG. 6, the signal demultiplexer circuit 32 is composed Of three D.flip-flops (referred to hereinafter as D-FF's) 51, 52 and 53 for holding the respective signals demultiplexed or restored from the multiplexed signal formed by multiplexing the signals MON, RPM and LED and transmitted by the signal line MPX1, a time division selector circuit 54 for determining the timing of separating the respective signals, and an AND gate 55 for extracting the starting point only of the multiplexed signal.

The signal line MPX1 is connected to the terminals D of the three D-FF's 51 to 53 respectively and to one of two input terminals of the AND gate 55. The output terminal of the AND gate 55 is connected to a terminal START of the time division selector circuit 54. The timing of generating output signals from output terminals Sb1, Sb2, Sb3 and Sb4 of the time division selector circuit 54 is determined on the basis of the leading edge of the signal input from the AND gate 55 to the terminal START. Further, a reference clock signal CLK2 is supplied from the motor circuit board 9 to an input terminal CK of the time division selector circuit 54 in order to determine the timing. The output terminal Sb1 of the time division selector circuit 54 is connected to the other input terminal of the AND gate 55 to produce a mask signal so that, after the starting point of the multiplexed signal appearing on the signal line MPX1 is extracted, the mask signal acts as a mask for inhibiting application of the output signal of the AND gate 55 to the terminal START. The output terminal Sb2 of the time division selector circuit 54 is connected to the terminal CK of the D-FF 51 so as to generate a timing signal for fetching the signal MON in the D-FF 51 when the signal MON in the multiplexed signal is being supplied on the signal line MPX1. The output terminal Sb3 of the time division selector circuit 54 is connected to the terminal CK of the D-FF 52 so as to generate a timing signal for fetching the signal RPM in the D-FF 52 when the signal RPM in the multiplexed signal is being supplied on the signal line MPX1. The output terminal Sb4 of the time division selector circuit 54 is connected to the terminal CK of the D-FF 53 so as to generate a timing signal for fetching the signal LED in the D-FF 53 when the signal LED in the multiplexed signal is being supplied on the signal line MPX1.

Figure 7:
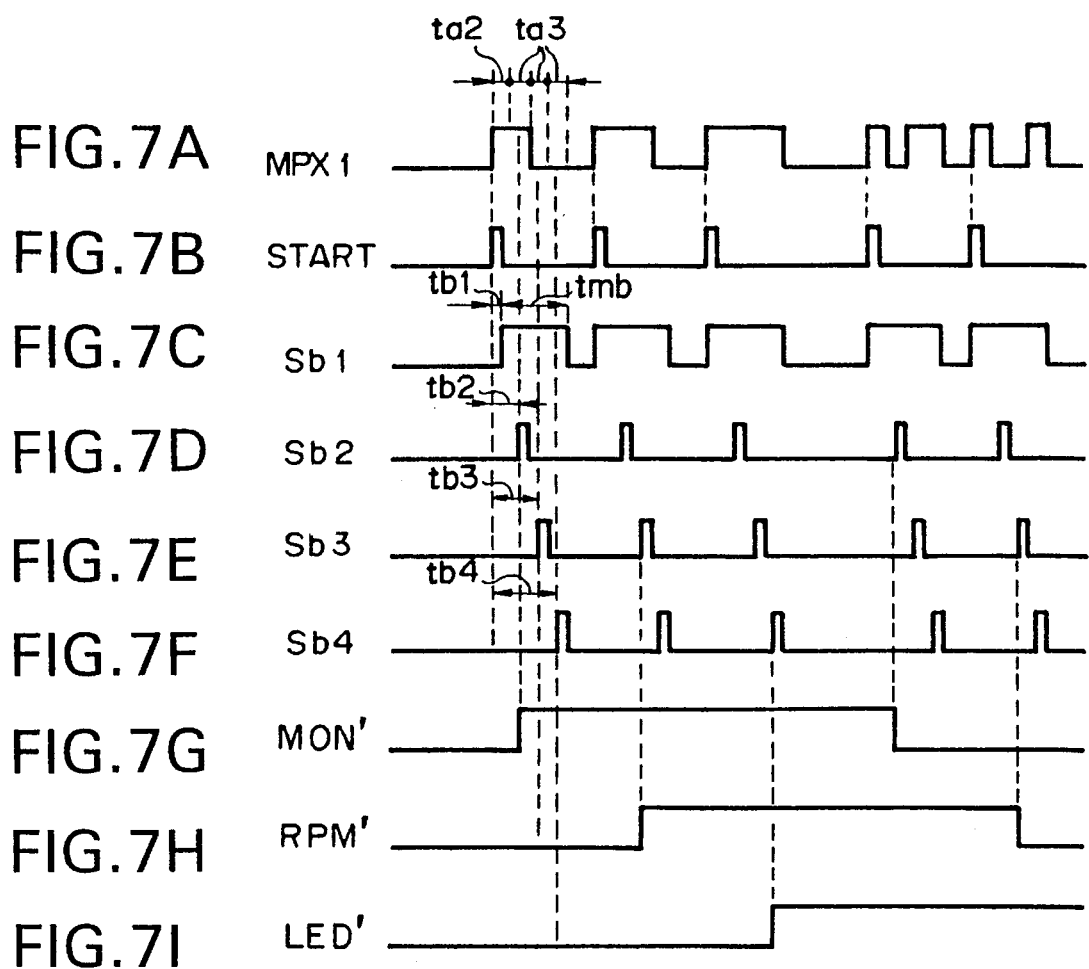
FIG. 7 is a timing chart of various signals in the signal demultiplexer circuit shown in FIG. 6.

FIG. 7 is now used to illustrate the timing of demultiplexing by the signal demultiplexer circuit 32. When a pulse of the multiplexed signal consisting of the signals MON, RPM and LED appears on the signal line MPX1, the AND gate 55 supplies its output pulse to the terminal START of the time division selector circuit 54. In response to the leading edge of the pulse inputted to the terminal START of the time division selector circuit 54, an output signal of high level appears from the terminal Sb1 during a period of tmb after a period of tb1 counted from the leading edge of the input pulse. During the period in which the output signal of high level is generated from the terminal Sb1, the output of the AND gate 55 is turned into its low level, and the terminal START is free from any change in the signal level of the multiplexed signal on the signal line MPX1. The length of the period of tmb is selected to be longer than the period required for passage of each of the individual signals forming the multiplexed signal but shorter than the time interval of appearance of the next signal of the multiplexed signal on the signal line MPX1. A pulse is generated from the terminal Sb2 of the time division selector circuit 54 with timing of a period of tb2 synchronous with the period of transmitting the signal MON on the signal line MPX1, so that the D-FF 51 fetches the signal MON in response to the leading edge of the pulse. The fetched signal is outputted as the signal MON' on a signal line connected to the terminal Q of the D-FF 51. A pulse is generated from the terminal Sb3 of the time division selector circuit 54 with timing of a period of tb3 synchronous with the period of transmitting the signal RPM on the signal line MPX1, so that the D-FF 52 fetches the signal RPM in response to the leading edge of the pulse. The fetched signal is outputted as the signal RPM' to a signal line connected to the terminal Q of the D-FF 52. Similarly, a pulse is generated from the terminal Sb4 of the time division selector circuit 54 with timing of a period of tb4 synchronous with the period of transmitting the signal LED on the signal line MPX1, so that the D-FF 53 fetches the signal LED in response to the leading edge of the pulse. The fetched signal is outputted as the signal LED' to a signal line connected to the terminal Q of the D-FF 53.

Figure 8:
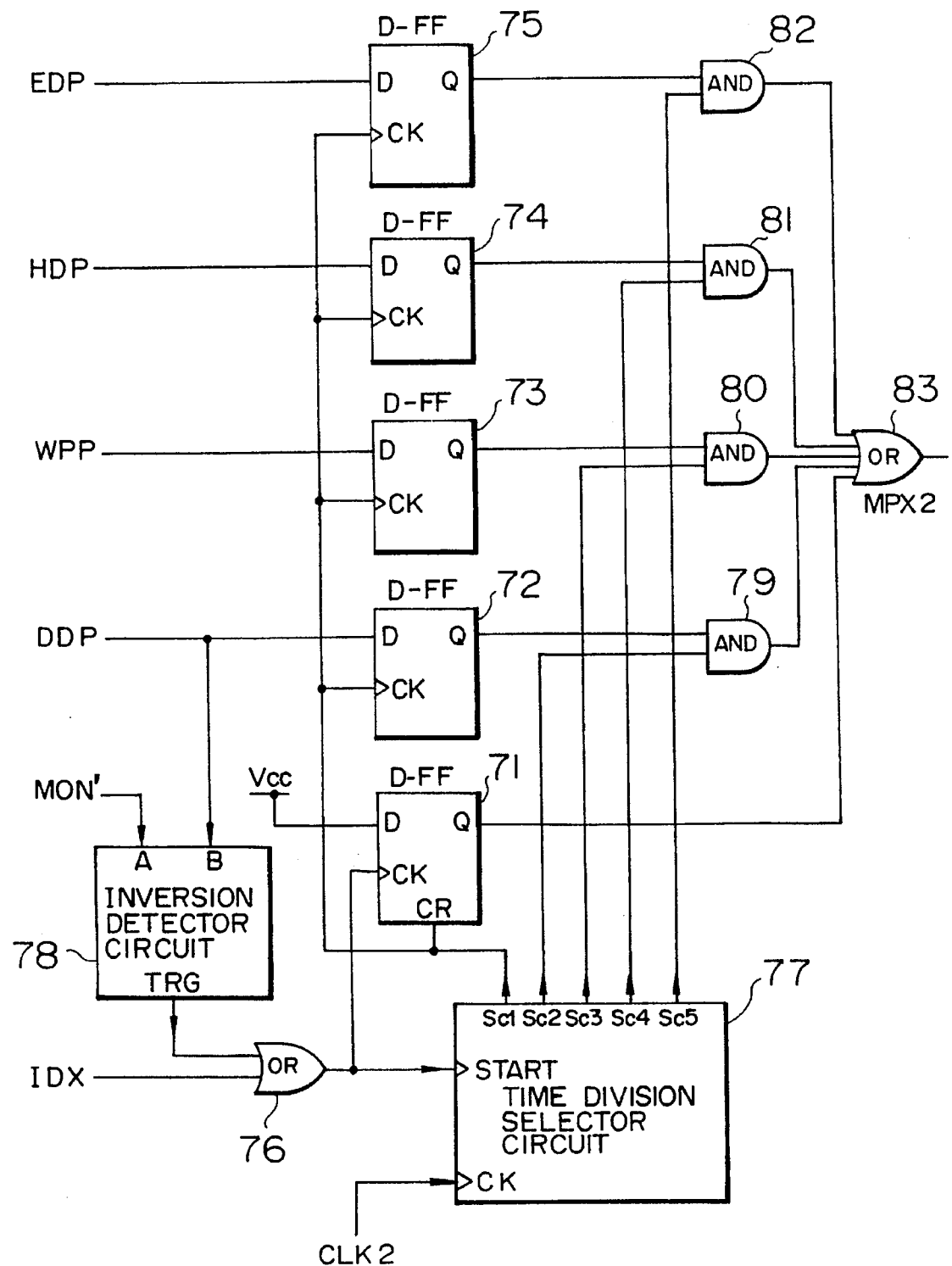
FIG. 8 is a circuit diagram showing the structure of the signal multiplexer circuit disposed on the motor circuit board in the magnetic recording and reproducing apparatus shown in FIG. 3.

FIG. 8 is a circuit diagram showing the structure of the signal multiplexer circuit 33. As shown in FIG. 8, D.flip-flops (referred to hereinafter as D-FF's) 71, 72, 73, 74 and 75 for holding the signals IDX, DDP, WPP, HDP and EDP respectively are provided, and the signal IDX is connected through an OR gate 76 to the terminal CK of the D-FF 71 and to a terminal START of a time division selector circuit 77. The signal line for DDP is connected to the terminal D of the D-FF 72, the signal line for WPP is connected to the terminal D of the D-FF 73, the signal line for HDP is connected to the terminal D of the D-FF 74, and the signal line for EDP is connected to the terminal D of the D-FF 75, respectively. The terminal D of the D-FF 71 is connected to Vcc, so that, when the signal IDX of high level is supplied to the terminal CK, an output signal of high level appears on the terminal Q and continues to be outputted until the D-FF 71 is reset. The signal line for MON' and the signal line for DDP are connected to terminals A and B of an inversion detector circuit 78 respectively. A pulse is generated from a terminal TRG of the inversion detector circuit 78 when the signal level of any one of the signals MON' and DDP supplied to the respective terminals A and B of the inversion detector circuit 78 is inverted. The terminal TRG is connected through the OR gate 76 to the terminal CK of the D-FF 71 and to the terminal START of the time division selector circuit 77. The timing of signals generated from output terminals Sc1, Sc2, Sc3, Sc4 and Sc5 of the time division selector circuit 77 is determined on the basis of the leading edge of the input to the terminal START. Further, the reference clock signal CLK2 used in the motor circuit board 9 is supplied to a terminal CK of the time division selector circuit 77 so as to determine the timing. The output terminal Sc1 of the time division selector circuit 77 is connected to the terminals CK of the D-FF 72, the D-FF 73, the D-FF 74 and the D-FF 75 respectively and also to the terminal CR of the D-FF 71, so that the signal levels at the respective terminals D of the D-FF's 72 to 75 are held in response to the leading edge of the output signal generated from the output terminal Sc1, while the D-FF 71 is reset. The output terminals Q of the D-FF's 72 to 75 are connected to one of two input terminals of AND gates 79 to 82 respectively. The output terminals Sc2, Sc3, Sc4 and Sc5 of the time division selector circuit 77 are connected to the other input terminal of the AND gates 79 to 82 respectively. Therefore, the output signals generated from the D-FF's 72 to 75 are gated by the output signals generated from the output terminals Sc2, Sc3, Sc4 and Sc5 of the time division selector circuit 77 respectively before being supplied as inputs to an OR gate 83. Further, the output signal generated from the output terminal Q of the D-FF 71 is directly supplied as an input to the OR gate 83. The output signal of the OR gate 83 is supplied to the record/reproduce control circuit board 8 by the signal line MPX2.

FIG. 9 is now used to illustrate the timing of the signals in the signal multiplexer circuit 33. When the signal IDX of high level is supplied through the OR gate 76 to the terminal CK of the D-FF 71, an output signal of high level is generated from the output terminal Q of the D-FF 71 and is supplied through the OR gate 83 to appear on the signal line MPX2. The signal IDX of high level is supplied also to the terminal START of the time division selector circuit 77. In response to the leading edge of the waveform of the signal IDX inputted to the terminal START of the time division selector circuit 77, an output pulse is generated from the output terminal Sc1 after a period of tc1. The D-FF's 72 to 75, in which the pulse generated from the terminal Sc1 of the time division selector circuit 77 is supplied as the input to their terminals CK, maintain the levels of the signals connected to their terminals D respectively, and such output signals are generated from their output terminals Q respectively. On the other hand, because the pulse generated from the output terminal Sc1 is also connected to the terminal CR of the D-FF 71, the D-FF 71 is reset at that time, and an output signal of low level appears on its output terminal Q. The output signal from the output terminal Q of the D-FF 71 is supplied through the PR gate 83 to the signal line MPX2. Therefore, a pulse having a pulse width tc3 is generated from the terminal Sc2 of the time division selector circuit 77 after a period of tc2 counted from the leading edge of the waveform of the signal IDX supplied to the terminal START, and a pulse having a pulse width tc3 is generated from the terminal Sc3 in synchronism with the trailing edge of the pulse generated from the terminal Sc2. A pulse having a pulse width tc3 is generated from the terminal Sc4 in synchronism with the trailing edge of the pulse generated from the terminal Sc3, and a pulse having a pulse width tc3 is generated from the terminal Sc5 in synchronism with the trailing edge of the pulse generated from the terminal Sc4. These pulse signals and the signals DDP, WPP, HDP and EDP held in the D-FF's 72 to 75 are supplied to the AND gates 79 to 82 respectively to be supplied to the OR gate 83. That is, the signal DDP latched in the D-FF 72 during the period of tc3 after the period of tc2 counted from the leading edge of the signal IDX supplied to the terminal START of the time division selector circuit 77, the signal WPP latched in the D-FF 73 during the period of tc3 counted from the trailing edge of the output signal generated from the terminal Sc2, the signal HDP latched in the D-FF 74 during the period of tc3 counted from the trailing edge of the output signal generated from the terminal Sc3, and the signal EDP latched in the D-FF 75 during the period of tc3 counted from the trailing edge of the output signal generated from the terminal Sc4 are supplied through the OR gate 83 to the signal line MPX2. According to such logic, the signals DDP, WPP, HDP and EDP are multiplexed in a time division mode in such a relation that the leading edge of the signal IDX is the starting point, and the multiplexed signal is outputted to the signal line MPX2. The inversion detector circuit 78 is used to produce the start signal for transmitting the multiplexed signal even when the signal MON' is in its low level or when the signal DDP is in its low level because the disk cartridge 1 is not loaded, that is, when the signal IDX is necessarily in its low level.

Figure 10:
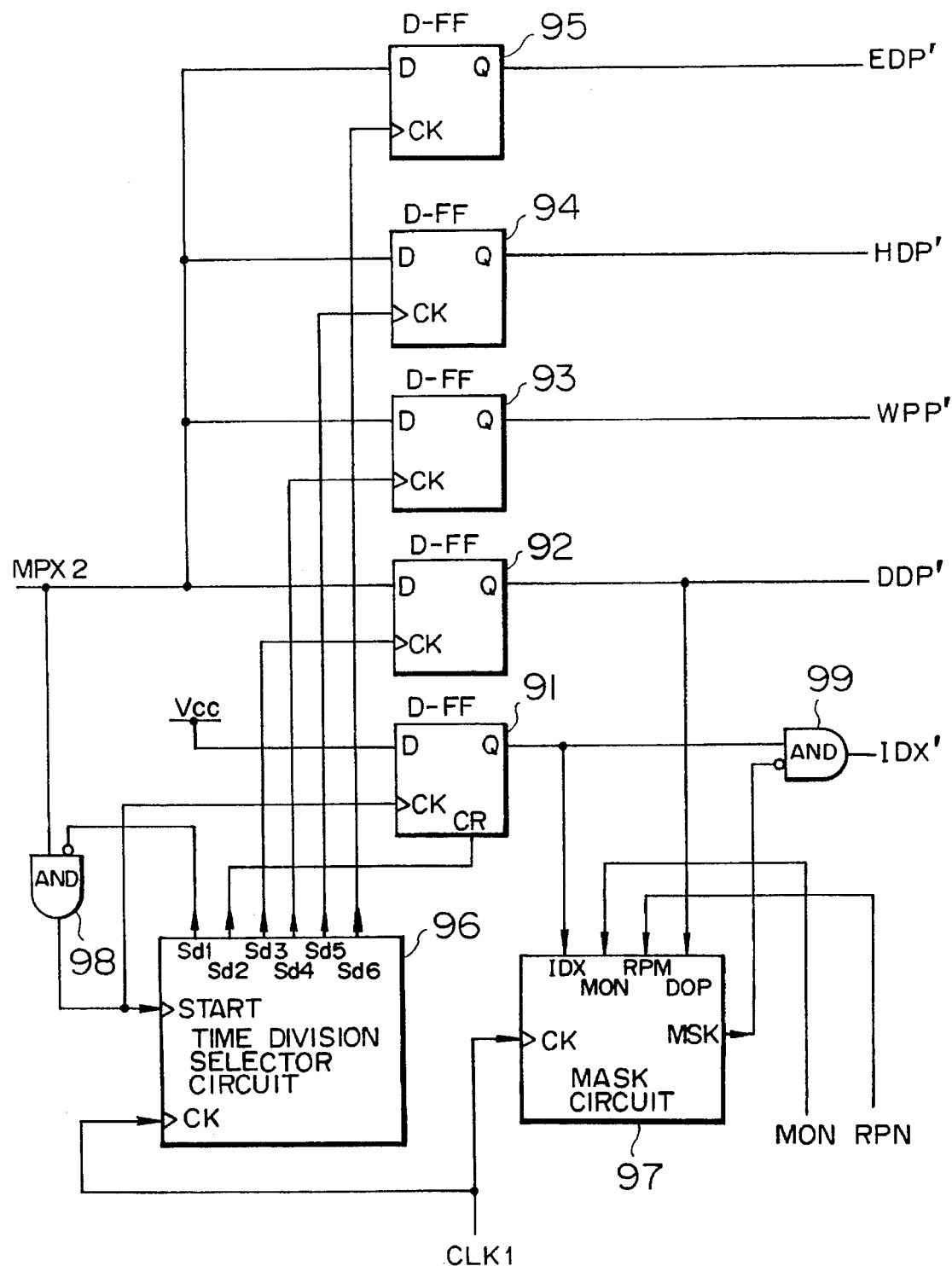
FIG. 10 is a circuit diagram showing the structure of the signal demultiplexer circuit disposed on the record/reproduce control circuit board in the magnetic recording and reproducing apparatus shown in FIG. 3.

FIG. 10 is a circuit diagram showing the structure of the signal demultiplexer circuit 21. As shown in FIG. 10, the signal demultiplexer circuit 21 is composed of five D.flip-flops (referred to hereinafter as D-FF's) 91 to 95 for holding the respective signals separated from the multiplexed signal supplied by the signal line MPX2 and formed by multiplexing the signals IDX, DDP, WPP, HDP and EDP, a time division selector circuit 96 for determining the timing of separation of the multiplexed signal into the individual signals, a mask circuit 97 for producing a mask signal when the signal IDX is not decided to be the start signal on the basis of the time intervals between the start signals in the multiplexed pulse trains and also on the basis of the signals MON, RPM and DDP' supplied thereto, an AND gate 98 for extracting the start point only of the multiplexed signal, and another AND gate 99 for extracting the signal IDX'.

The signal line MPX2 is connected to the terminals D of the respective D-FF's 92 to 95 and to one of two input terminals of the AND gate 98. The D-FF 91 is connected at its terminal D to Vcc, and, in response to the leading edge of a signal supplied to its terminal CK, an output signal of high level appears on its output terminal Q. This corresponds to the leading edge of the signal IDX, and the high level is maintained until an output signal of high level is generated from an output terminal Sd2 of the time division selector circuit 96 connected to the terminal CR of the D-FF 91. The output of the AND gate 98 is connected to the terminal CK of the D-FF 91 and to a terminal START of the time division selector circuit 96. The timing of output signals generated from output terminals Sd1, Sd2, Sd3, Sd4, Sd5 and Sd6 of the time division selector circuit 96 is determined on the basis of the leading edge of the signal inputted to the terminal START. The reference clock signal CLK1 is supplied from the record/reproduce control circuit board 8 to the terminal Ck of the time division selector circuit 96 so as to determine the timing. The output terminal Sd1 of the time division selector circuit 6 is connected to the other input terminal of the AND gate 98 to produce the mask signal, so that, after the start point of the multiplexed signal supplied by the signal line MPX2 is extracted, no signal may be supplied to the terminal START. The output terminal Sd2 of the time division selector circuit 96 is connected to the terminal CR of the D-FF 91 so as to reset the D-FF 91. The output terminal Sd3 is connected to the terminal CK of the D-FF 92 so as to generate a timing signal for fetching the signal DDP in the D-FF 92 when the signal DDP in the multiplexed signal is being supplied on the signal line MPX2. The output terminal Sd4 is connected to the terminal CK of the D-FF 93 so as to generate a timing signal for fetching the signal WPP in the D-FF 93 when the signal WPP in the multiplexed signal is being supplied on the signal line MPX2. The output terminal Sd5 is connected to the terminal CK of the D-FF 94 so as to generate a timing signal for fetching the signal HDP in the D-FF 94 when the signal HDP in the multiplexed signal is being supplied on the signal line MPX2. The output terminal Sd6 is connected to the terminal CK of the D-FF 95 so as to generate a timing signal for fetching the signal EDP in the D-FF 95 when the signal EDP in the multiplexed signal is being supplied on the signal line MPX2.

FIG. 11 is now used to illustrate the timing of demultiplexing by the signal demultiplexer circuit 21. When a pulse of the multiplexed signal consisting of the signals IDX, DDP, WPP, HDP and EDP appears on the signal line MPX2, the AND gate 98 supplies its output pulse to the terminal CK of the D-FF 91 and to the terminal START of the time division selector circuit 96. In response to the leading edge of the signal supplied to the terminal CK of the D-FF 91, an output signal of high level appears immediately on its output terminal Q. In response to the leading edge of the pulse supplied to the terminal START of the time division selector circuit 96, an output signal of high level is generated from the output terminal Sd1 during a period of tmd after a period of td1 counted from the leading edge of the pulse. During the period in which the output signal from the terminal Sd1 is maintained in its high level, the output signal of the AND gate 98 is in its low level, and the terminal START is free from any change in the level of the multiplexed signal on the signal line MPX2.

The length of the period of tmd is selected to be longer than the period required for passage of each of the individual signals forming the multiplexed signal but shorter than the time interval of appearance of the next signal of the multiplexed signal. The signal generated from the output terminal Sd2 of the time division selector circuit 96 acts to reset the D-FF 91 and acts also to determine the pulse width of the signal IDX. That is, the pulse width of the signal IDX is equal to a period of td2 between the time where the output signal of high level is generated from the output terminal Q of the D-FF 91 in response to the leading edge of the input to the terminal CK and the time where the D-FF 91 is reset in response to the signal of high level supplied to its terminal CR, and the output signal of the output terminal Q is turned into its low level. The output terminal Sd3 of the time division selector circuit 96 generates a pulse with timing of a period of td3 synchronous with the period of transmitting the signal DDP in the multiplexed signal on the signal line MPX2, and the D-FF 92 fetches the signal DDP in response to the leading edge of the pulse. The fetched signal is outputted as the signal DDP' on a signal line connected to the output terminal Q of the D-FF 92. The output terminal Sd4 generates a pulse with timing of a period of td3+td4 synchronous with the period of transmitting the signal WPP in the multiplexed signal on the signal line MPX2, and the D-FF 93 fetches the signal WPP in response to the leading edge of the pulse. The fetched signal is outputted as the signal WPP' on a signal line connected to the output terminal Q of the D-FF 93. The output terminal Sd5 generates a pulse with timing of a period of td3+2×td4 synchronous with the period of transmitting the signal HDP in the multiplexed signal on the signal line MPX2, and the D-FF 94 fetches the signal HDP in response to the leading edge of the pulse. The fetched signal is outputted as the signal HDP' on a signal line connected to the output terminal Q of the D-FF 94. The output terminal Sd6 generates a pulse with timing of a period of td3+3×td4 synchronous with the period of transmitting the signal EDP in the multiplexed signal on the signal line MPX2, and the D-FF 95 fetches the signal EDP in response to the leading edge of the pulse. The fetched signal is outputted as the signal EDP' on a signal line connected to the output terminal Q of the D-FF 95.

It will be seen from the above description of the preferred embodiment of the present invention that a plurality of signals transmitted between the motor circuit board 9 and the record/reproduce control circuit board 8 are multiplexed in the manner described above. Therefore, a total of four signal lines only are required for connection between these two circuit boards 9 and 8, so that the number of required signal lines can be greatly decreased as compared to the prior art example where at least ten signal lines are required.

It will be understood from the foregoing description of the present invention that a plurality of signals to be transmitted between a plurality of printed wiring boards are multiplexed so as to decrease the number of signal lines required for establishing the connection between the printed wiring boards. Therefore, a cable and connectors having a small number of terminals can be used to improve the reliability of the connection and also to reduce the space occupied by the cable and connectors, so that the size and structure of the connection can be reduced and simplified.

In the illustrated embodiment of the present invention, a change in the signal level of any one of the signals to be transmitted is detected, and, on the basis of the result of detection, the signals are divided with respect to time and multiplexed so as to simplify the structure of the circuit and to minimize transmission of excessive and redundant information. However, it is apparent that the desired object can also be attained when the signals are sequentially divided with respect to time and multiplexed by the use of a clock pulse signal having a predetermined time interval between the clock pulses.

I claim:

1. A magnetic recording and reproducing apparatus comprising:

recording and reproducing means for magnetically recording information on a recording medium and reproducing the recorded information from the recording medium;

at least two circuit boards, electrically connected to each other by a cable, for controlling recording and reproducing operations of said recording and reproducing means;

a signal multiplexer circuit, disposed on each of said at least two circuit boards, for time-dividing a plurality of control signals to be transmitted between said at least two circuit boards and then multiplexing the time-divided control signals to supply a multiplexed control signal to a single signal line of said cable; and a signal demultiplexer circuit, disposed on each of said at least two circuit boards, for demultiplexing the multiplexed control signal into individual control signals, wherein:

each of said plurality of control signals has a binary value;

said signal multiplexer circuit detects a level inversion of any one of said plurality of control signals to sequentially time-divide said plurality of control signals by using, as a reference start point, a time point when said level inversion of said control signal is detected and thereby produces the multiplexed control signal; and said signal demultiplexer circuit detects a level inversion of said multiplexed control signal to demultiplex said multiplexed control signal by using, as a reference start point, a time point when said level inversion of said multiplexed control signal is detected and thereby obtains said individual control signals.

2. A magnetic recording and reproducing apparatus according to claim 1, wherein:

said signal multiplexer circuit receives a reference clock signal used in one of said at least two circuit boards, on which said signal multiplexer circuit is disposed, to determine timing for time-dividing said plurality of control signals on the basis of said reference clock signal; and said signal demultiplexer circuit receives a reference clock signal used in one of said at least two circuit boards, on which said signal demultiplexer circuit is disposed, to determine timing for demultiplexing of said multiplexed control signal on the basis of said reference clock signal.

3. A magnetic recording and reproducing apparatus according to claim 1, wherein said signal multiplexer circuit delays start of further time-division by a predetermined period when said signal multiplexer circuit detects level inversion of any one of said plurality of control signals while said signal multiplexer circuit is carrying out time division.

4. A magnetic recording and reproducing apparatus according to claim 1, wherein said signal demultiplexer circuit generates a mask signal so that any level inversion of said multiplexed control signal may not be detected during a predetermined period after the level inversion of said multiplexed control signal is detected.

* * * * *